Figure 1:
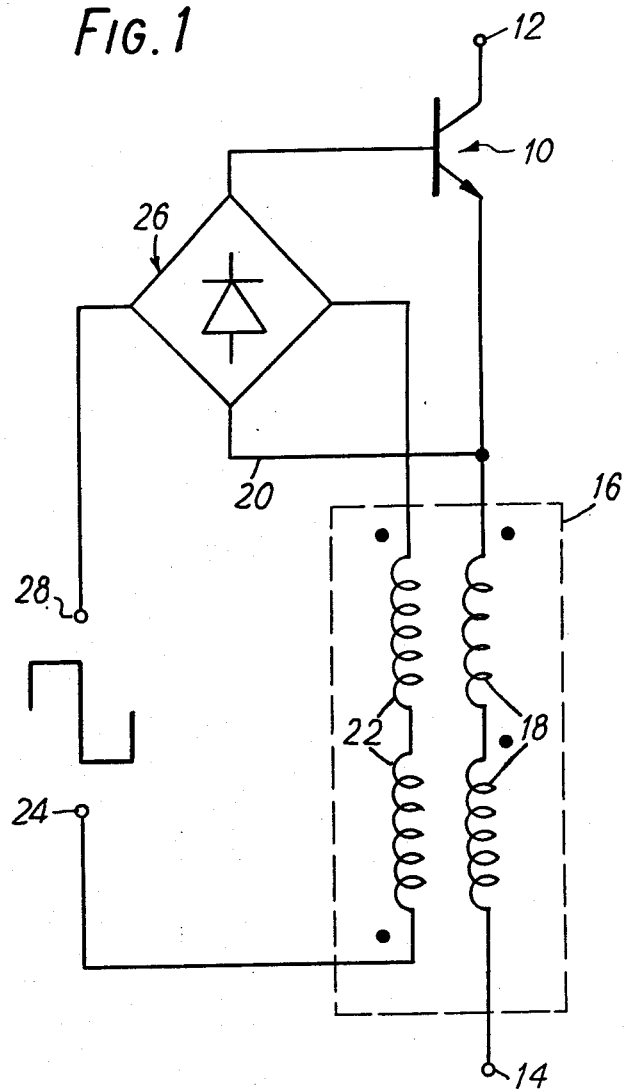

United States Patent [19]

King et al.

[11] 4,066,916
[45] Jan. 3, 1978

[54] TRANSISTOR DRIVE CIRCUITS

[75] Inventors: Kenneth Gordon King; Derek Ernest Burch, both of London, England

[73] Assignee: Westinghouse Brake & Signal Co. Ltd., England

[21] Appl. No.: 663,246

[22] Filed: Mar. 2, 1976

[30] Foreign Application Priority Data

Mar. 25, 1975 United Kingdom ............... 12491/75

[51] Int. Cl.² ............................................. H03K 17/00
[52] U.S. Cl. .................................. 307/253; 307/254; 307/270; 307/296A
[58] Field of Search ............... 307/254, 253, 314, 270, 307/296, 300; 331/112

[56] References Cited
U.S. PATENT DOCUMENTS

| | | | |
|---|---|---|---|
| 3,182,249 | 5/1965 | Pahlavan ............................. | 307/314 |
| 3,239,681 | 3/1966 | Bond ................................... | 307/270 |
| 3,289,040 | 11/1966 | Pfau et al. ........................... | 307/314 |
| 3,448,299 | 6/1969 | Hierholzer, Jr. et al. ........... | 307/305 |
| 3,657,577 | 4/1972 | Wakiai et al. ....................... | 307/300 |
| 3,999,086 | 12/1976 | Ekelund ............................... | 307/270 |

*Primary Examiner*—Stanley D. Miller, Jr.
*Assistant Examiner*—B. P. Davis
*Attorney, Agent, or Firm*—Larson, Taylor and Hinds

[57] ABSTRACT

A transistor drive circuit arrangement in which the collector current of a transistor is passed through the primary or control windings of a direct current current-transformer or transductor and the secondary or output windings of the current-transformer or transductor control the passage of alternating current via rectifying means which provides base current drive for the transistor. Thereby the base current is directly related to instantaneous collector current which results in significant power economies relative to prior art arrangements in which the base is continuously over-driven to ensure permanent base-emitter saturation.

24 Claims, 4 Drawing Figures

TRANSISTOR DRIVE CIRCUITS

This invention relates to transistor drive circuit arrangements.

Transistors are often employed in a switching mode for the control of electrical power, examples being inverters and chopper regulators. For such applications there exists the requirement of providing a drive current to control the conductivity of the transistor. The arrangement for providing the drive current should ideally be easy to control and economic in respect of power consumption. Prior art arrangements tend to waste in ballasting resistors and to provide drive current of a magnitude appropriate to the maximum peak current to be carried by the transistor rather than actual instantaneous current which may be significantly less than the peak current.

It is therefore an object of the invention to provide an imprioved transistor drive circuit arrangement.

According to the invention there is provided a transistor drive circuit arrangement comprising a direct current current-transformer or transductor having primary or control windings connected in use to carry the collector current of the transistor and secondary or output windings coupled to control alternating current from a source of alternating current and applicable via rectifying means to the transistor to drive the transistor in a sense to maintain or increase the conductivity thereof.

The drive circuit arrangement may be adapted for selective discontinuation of the transistor drive, by open-circuiting of the secondary or output windings, or by discontinuing the supply of alternating current from the source thereof, or by short-circuiting the transistor base circuit.

The secondary or output windings may be single phase or plural phase, for example, bi-phase. The rectifying means is preferably a full-wave rectifier. When included in the arrangement, the source of alternating current may be a high-frequency inverter. The current transformer or transductor may be provided with further control windings for the application of triggering and/or bias signals.

In order that the invention may be more clearly understood and readily put into effect, embodiments of the same will now be described by way of example only, with reference to the accompanying drawings wherein:

FIGS. 1, 2, 3 and 4 are circuit diagrams of respectively first, second, third and fourth embodiments of the invention.

In the drawings, like parts in the different embodiments are designated by the same reference numerals.

Referring first to FIG. 1, an n-p-n transistor 10 requires to be driven so as selectively to switch current between terminals 12 and 14. To this end, a direct-current current-transformer (d.c.c.t.) or transductor 16 of known form is connected to have its primary or control windings 18 in series between the terminal 14 and the emitter of the transistor 10. It will be noted that although connected on the emitter side of the transistor 10, the control windings 18 carry only the collector current of the transistor 10 since the base component of the emitter current is tapped off via the connection 20. Thus the windings 18 could equally be connected in series between the terminal 12 and the collector of the transistor 10.

The d.c.c.t. or transductor 16 has secondary or output windings 22 connected in series between a first a.c. supply terminal 24, the a.c. terminals of a full-wave rectifying bridge 26 and a second a.c. supply terminal 28. The relative polarities of the windings 18 and 22 are denoted by the conventional dot notation.

The negative terminal of the rectifying bridge 26 is connected via the connection 20 to the emitter of the transistor 10 and the positive terminal of the bridge 26 is connected to the base of the transistor 10.

In operation, current flowing from the terminal 12 to the terminal 14 via the control windings 18 will in known manner reduce the impedance presented by the windings 22 and so increase the magnitude of alternating current passing from the supply terminal 24 to the supply terminal 28 via the rectifying bridge 26. The consequential d.c. output of the bridge 26 will drive base-emitter current through the transistor 10, so increasing the collector-emitter conductivity of the transistor 10. (The d.c. output of the bridge 26 may be smoothed by any suitable means (not shown)). The net result is a regenerative drive of the transistor 10 in a sense to maintain or enhance its conductivity.

The circuit arrangement of FIG. 1 is merely intended to illustrate the principle of regenerative transistor drive utilising a d.c.c.t. or transductor and means for initiation and termination of the drive have been omitted from FIG. 1 for clarity, but various forms thereof will now be detailed with reference to FIGS. 2, 3 nd 4.

Figure 2:
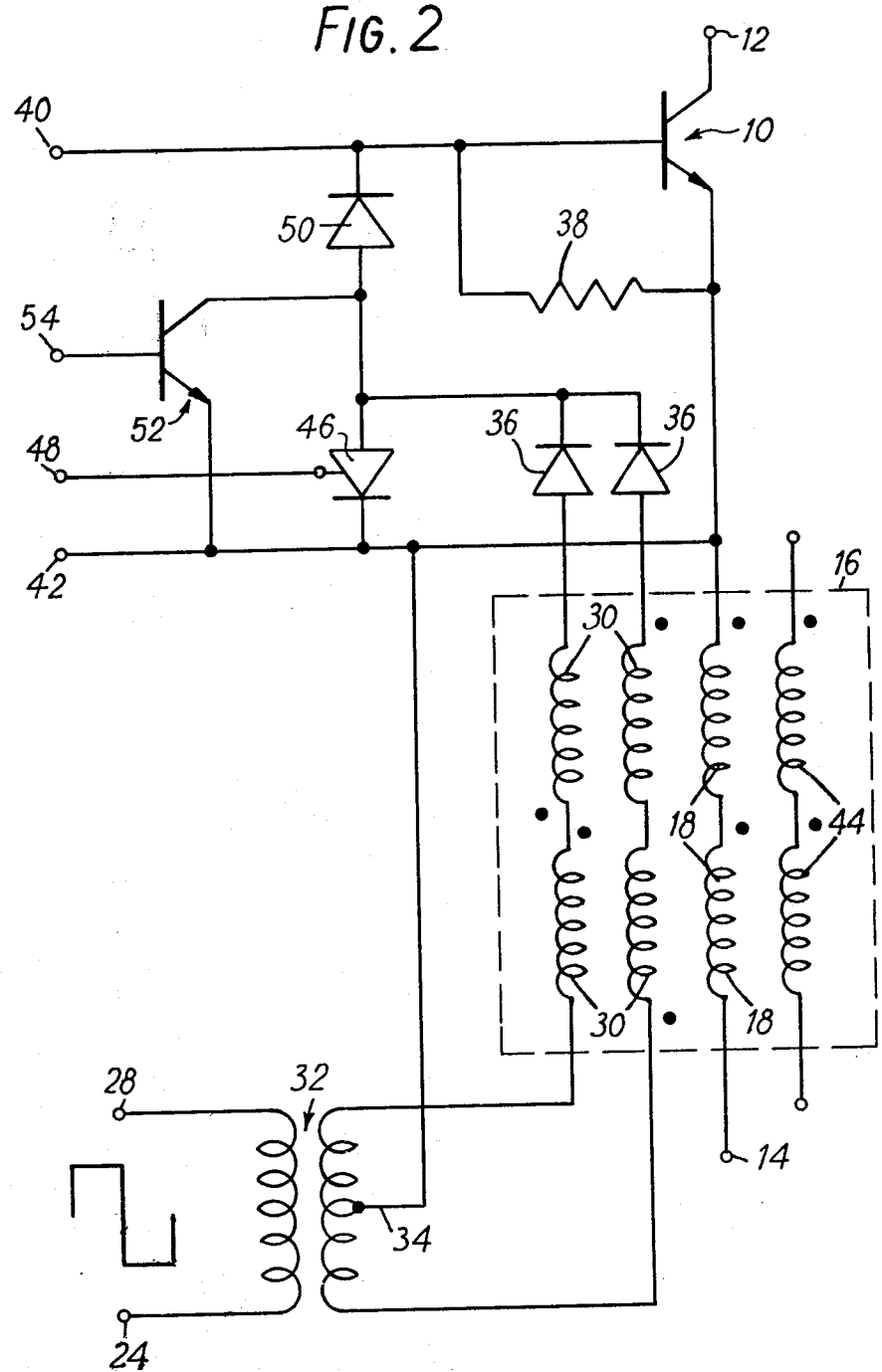

Referring to FIG. 2, the single-phase secondary or output windings 22 of the d.c.c.t. or transductor 16 are replaced by bi-phase secondary or output windings 30 and the a.c. supply comes via a transformer 32 having a secondary winding with a centre tap 34 directly connected to the emitter of the transistor 10. The outputs of the windings 30 are rectified by a pair of rectifying diodes 36. The above described bi-phase arrangement has the advantage of a reduced voltage drop compared to the FIG. 1 arrangement, but the basic principles are exactly the same.

The base and emitter of the transistor 10 are shunted by a resistor 38.

In operation of the FIG. 2 circuit arrangement the transistor 10 in initially turned on (rendered conductive) by application of a small control current between a base control terminal 40 and an emitter control terminal 42, the control current preferably being maintained for the whole duration of the intended period of conduction of the transistor 10. Alternatively the transistor 10 could be initially turned on by applying a small current through additional control windings 44 of transductor 16, producing the same turn-on effect as above but with the advantage of a useful power gain. Current between the terminals 12 and 14 then builds up rapidly by the action of positive feedbck as rectified alternating current from the supply terminals 24 and 28 is applied between the base and emitter of the transistor 10 via the transductor 16, the base current being in a virtually fixed ratio to the collector current. By way of example, the ratio of collector current to base current could be six to one.

To turn off the transistor 10 (render it low conductivity), the control current(s) applied between the terminals 40 and 42 and/or through the windings 44 is terminated and a thyristor 46 is triggered by application of a gating signal between terminals 48 and 42, so as to short-circuit the output of the transductor 16. This shunts the base drive to the transistor 10 and nullifies the previous regenerative feedback drive.

As a practical point, it may be noted that d.c.c.t.'s and transductors produce a certain output even when there is no current in the primary or control windings, due to the magnetising current of the saturable inductors. To ensure that this does not prevent the proper turning-off of the transistor 10, it is preferred (though not necessarily absolutely essential in all cases) to incorporate two features in the FIG. 2 circuit arrangement. These features comprise a diode 50 connected in series with the base of the transistor 10 in order to make the shunting effect of the thyristor 46 more effective; and a small auxiliary transistor 52 connected in parallel with the thyristor 46 and turned on by a signal applied to its base terminal 54, this signal being the same as applied at the terminal 48. Thereby a reasonably low shunting impedance is maintained at voltages below the threshold voltages of the thyristor characteristics.

Figure 3:
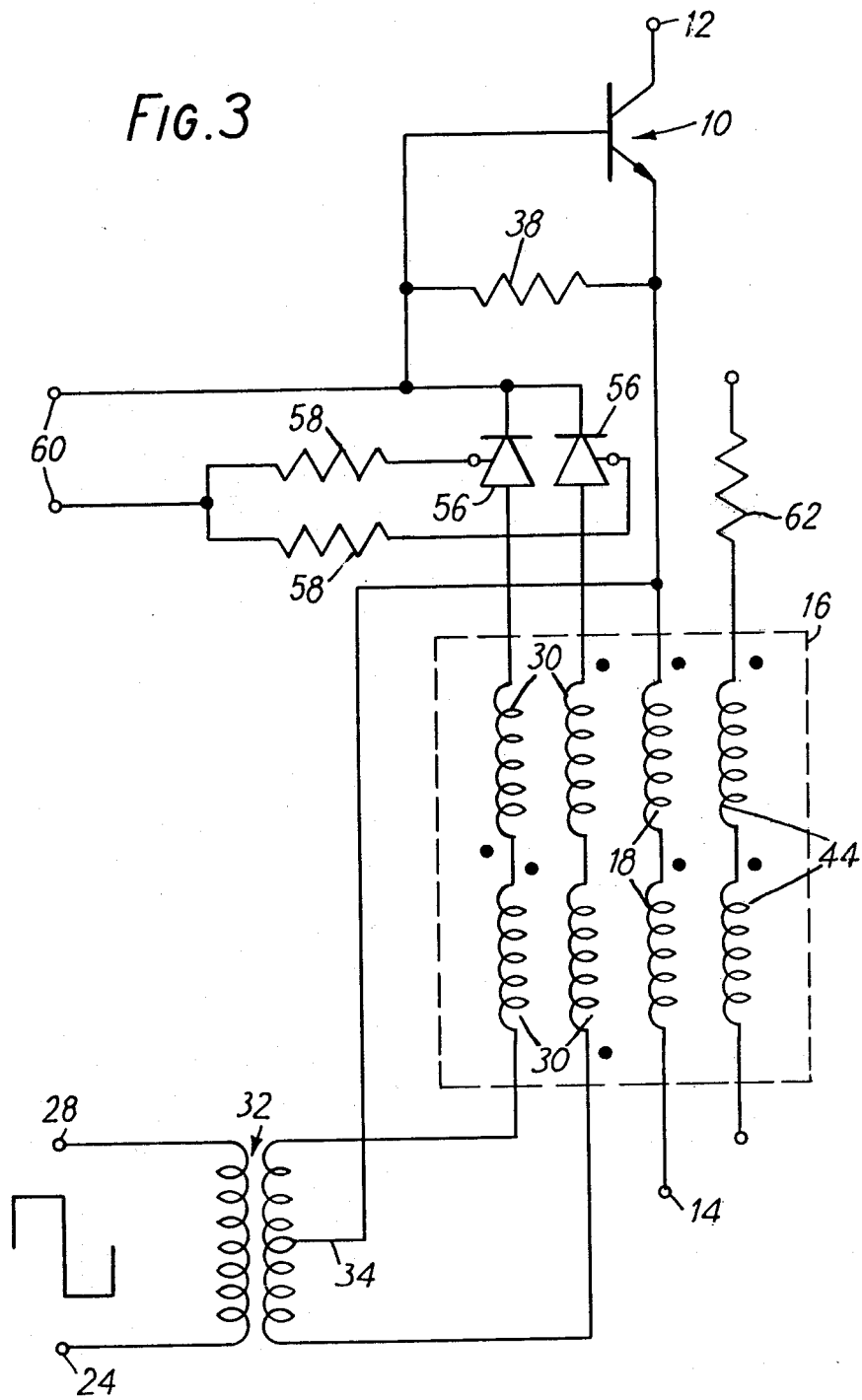

The drive circuit arrangement of FIG. 3, now to be described, is based upon the fact that the a.c. supply received at the terminals 24 and 28 passes through zero twice per cycle and that it is possible to interrupt the power supply to the transductor 16 instead of diverting the power output as in FIG. 2. The maximum delay in interrupting the base drive to the transistor 10 is then one half of the period of the a.c. supply at the terminals 24 and 28, being 25 microseconds with a 20 kilohertz supply. Such a delay is probably acceptable in the case where the transistor 10 is functioning as a current-switching element in a relatively low-frequency inverter. Suitable means for achieving the requisite interruption comprises replacing the diodes 36 of the FIG. 2 arrangement by thyristors 56 controlled via resistors 58 by suitable gating signals applied to terminals 60. The shunting circuitry of the FIG. 2 arrangement is not required in the FIG. 3 arrangement, nor is a separate control signal for turning off required. The additional control windings 44 carry a steady bias current, limited by a resistor 62, to ensure that the drive to the transistor 10 builds up satisfactorily when the thyristors 56 are gated on. Other switching arrangements could be course be employed.

Figure 4:
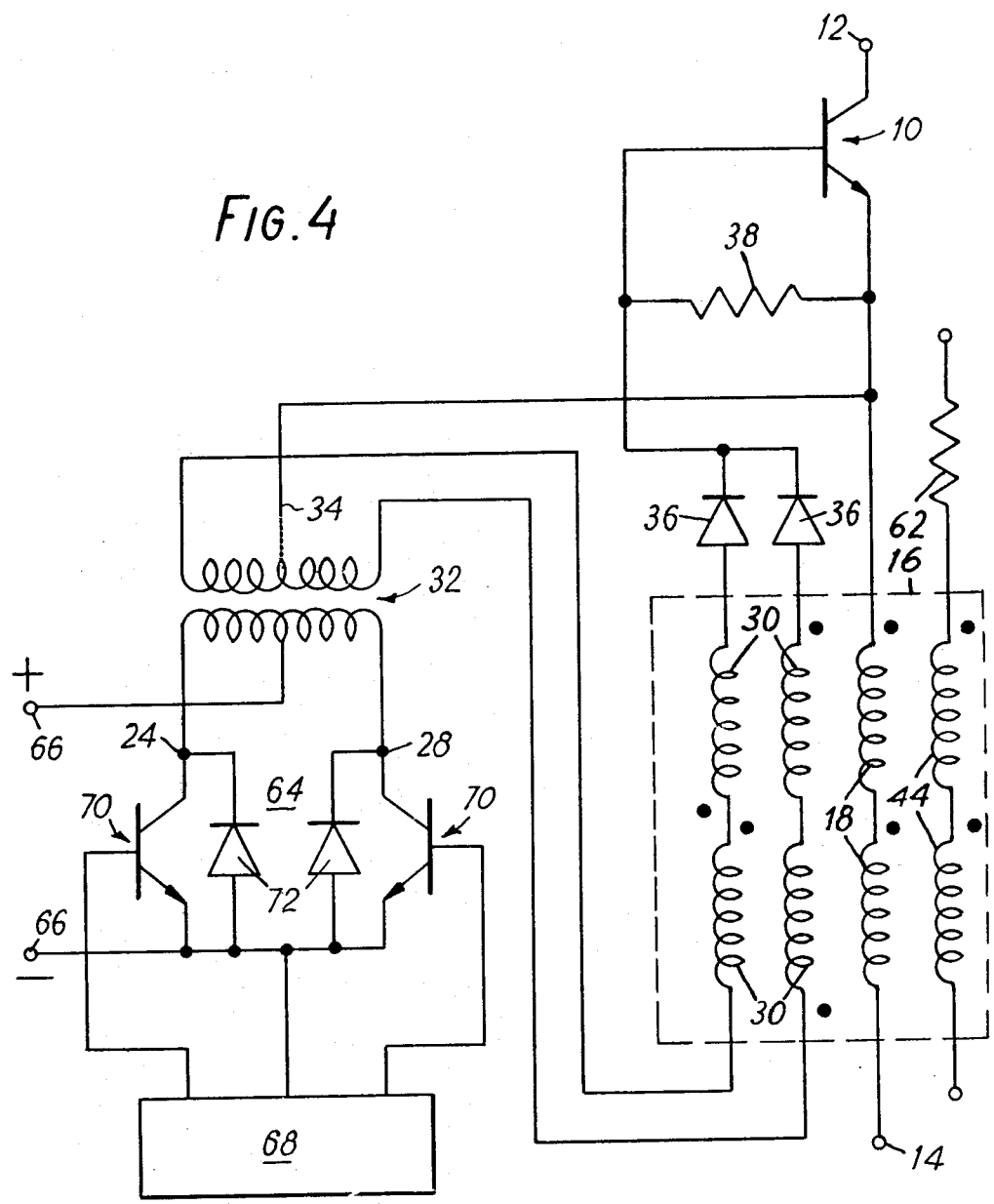

A still further alternative to the above described drive circuit arrangements will now be described with reference to FIG. 4, wherein control of the drive to the transistor 10 is achieved by directly controlling the alternating current supply connected to the terminals 24 and 28. As shown in FIG. 4, the a.c. supply takes the form of a small inverter 64, converting a d.c. supply at terminals 66 to alternating current under the control of a suitable control circuit 68 alternately triggering the inverter switching transistors 70, (each being shunted by a respective free-wheel diode 72). The control circuit 68 can cause the inverter 64 to halt at any selected instant, ending the a.c. supply at the terminals 24 and 28 and terminating the power input to the transductor 16 so causing cessation of the drive to the transistor 10.

The provision of a separate d.c. supply 66 is not necessarily a disadvantage since in practice such an auxiliary supply would probably be required in any event for other auxiliary circuits. Where the transistor 10 forms a switching element of an inverter, the supply 66 could be the main direct current power supply for the inverter. The use of a high frequency (for example 20 kilohertz) for the operation of the inverter 64 enables a relatively small and inexpensive transformer 32. Moreover such a high frequency enables the core materials of the d.c.c.t. or transductor 16 to be smaller and cheaper (e.g. ferrites) than would be required for, say, an alternating-current current-transformer.

Variations and modifications of the above described embodiments are possible. The output of the transductor 16 may be rectified by an arrangement other than shown. The output windings of the transducer 16 may be arranged in other than the single-phase configuration of FIG. 1 and the bi-phase configuration of FIGS. 2, 3 and 4. In each embodiment, smoothing means (not shown) may be incorporated to smooth the base-emitter current applied to drive the transistor 10.

A principal advantage of all described embodiments of the invention is that by reason of the manner in which the collector current of the transistor 10 is the control input to the d.c.c.t. or transductor 16 and thereby controls the output of the d.c.c.t. or transductor 16 which becomes the base-emitter current of the transistor 10, the base-emitter current which drives the transistor 10 is directly related to the instantaneous collector current. Thus the drive to the transistor 10 tends to be only that which is instantaneously necessary to maintain the transistor 10 substantially saturated (i.e. with minimum collector-emitter voltage drop) and the drive does not consume excess power such as is the case in prior art drive circuit arrangements where the base-emitter current is always at a magnitude to maintain the transistor saturated at peak collector-emitter current loads. Thereby the invention minimises power losses while enabling easy controllability of the transistor drive.

Having thus described our invention, what we claim is:

1. A transistor drive circuit for driving a transistor having base, emitter, and collector electrodes, comprising a direct current current-transformer having primary windings and secondary windings, a source of alternating current, rectifying means, means for connecting the primary windings in series with the collector-emitter path of the transistor to carry the collector current flowing therein, and means for connecting the source of alternating current in a series circuit with the secondary windings and through the rectifying means to the base-emitter path of the transistor to supply the base current flowing therein, the secondary windings being connected in a polarity sense such that increasing collector current and hence increasing current in the primary windings causes a decreasing of the impedance presented by the secndary windings and thus increasing current in the secondary windings and increasing base current.

2. The drive circuit of claim 1, further including means for selectively discontinuing base current.

3. The drive circuit of claim 2, wherein the means for selectively discontinuing base current comprise means for open-circuiting the secondary windings.

4. The drive circuit of claim 2, wherein the means for selectively discontinuing base current comprise means for discontinuing the supply of alternating current from the source thereof.

5. The drive circuit of claim 2, wherein the means for selectively discontinuing base current comprise means for at least unidirectionally short-circuiting the base-emitter path.

6. The drive circuit of claim 1, wherein the secondary windings are coupled in single-phase configuration.

7. The drive circuit of claim 1, wherein the secondary windings are coupled in plural-phase configuration.

8. The drive circuit of claim 7, wherein the plural-phase configuration is a bi-phase configuration.

9. The drive circuit of claim 1, wherein the rectifying means is a full-wave rectifier.

10. The drive circuit of claim 1, wherein the source of alternating current is a high-frequency inverter.

11. The drive circuit of claim 1, wherein the current-transformer includes further primary windings coupled for the application of control signals.

12. A method of driving a transistor including the steps of passing the collector current of the transistor through the primary windings of a direct current current-transformer and providing the base current of the transistor from a rectified alternating current passing through secondary windings of the current-transformer so that the base current drive provided by said rectified alternating current is increased due to the decreased impedance presented by the secondary windings as caused by the collector current flow through the primary windings of the current-transformer.

13. A transistor drive circuit for driving a transistor having base, emitter, and collector electrodes, comprising a transductor having control windings and output windings, a source of alternating current, rectifying means, means for connecting the control windings in series with the collector-emitter path of the transistor to carry the collector current flowing therein, and means for connecting the source of alternating current in a series circuit with the output wondings and through the rectifying means to the base-emitter path of the transistor to supply the base current flowing therein, the output windings being connected in a polarity sense such that increasing collector current and hence increasing current in the control windings causes decreasing impedance presented by the output windings and hence increasing current in the output windings and increasing base current.

14. The drive circuit of claim 13, further including means for selectively discontinuing base current.

15. The drive circuit of claim 14, wherein the means for selectively discontinuing base current comprise means for open-circuiting the output windings.

16. The drive circuit of claim 14, wherein the means for selectively discontinuing base current comprise means for discontinuing the supply of alternating current from the source thereof.

17. The drive circuit of claim 14, wherein the means for selectively discontinuing base current comprise means for at least unidirectionally short-circuiting the base-emitter path.

18. The drive circuit of claim 13, wherein the output windings are coupled in single-phase configuration.

19. The drive circuit of claim 13, wherein the output windings are coupled in plural-phase configuration.

20. The drive circuit of claim 19, wherein the plural-phase configuration is a bi-phase configuration.

21. The drive circuit of claim 13, wherein the rectifying means is a full-wave rectifier.

22. The drive circuit of claim 13, wherein the source of alternating current is a high-frequency inverter.

23. The drive circuit of claim 13, wherein the transductor includes further control windings coupled for the application of control signals.

24. A method of driving a transistor including the steps of passing the collector current of the transistor through the control windings of a transductor and providing the base current of the transistor from a rectified alternating current passing through output windings of the transductor so that the base current drive provided by said rectified alternating current is increased due to the decreased impedance presented by the output windings as caused by the collector current flow through the control windings of the transductor.

* * * * *